Figure 1:
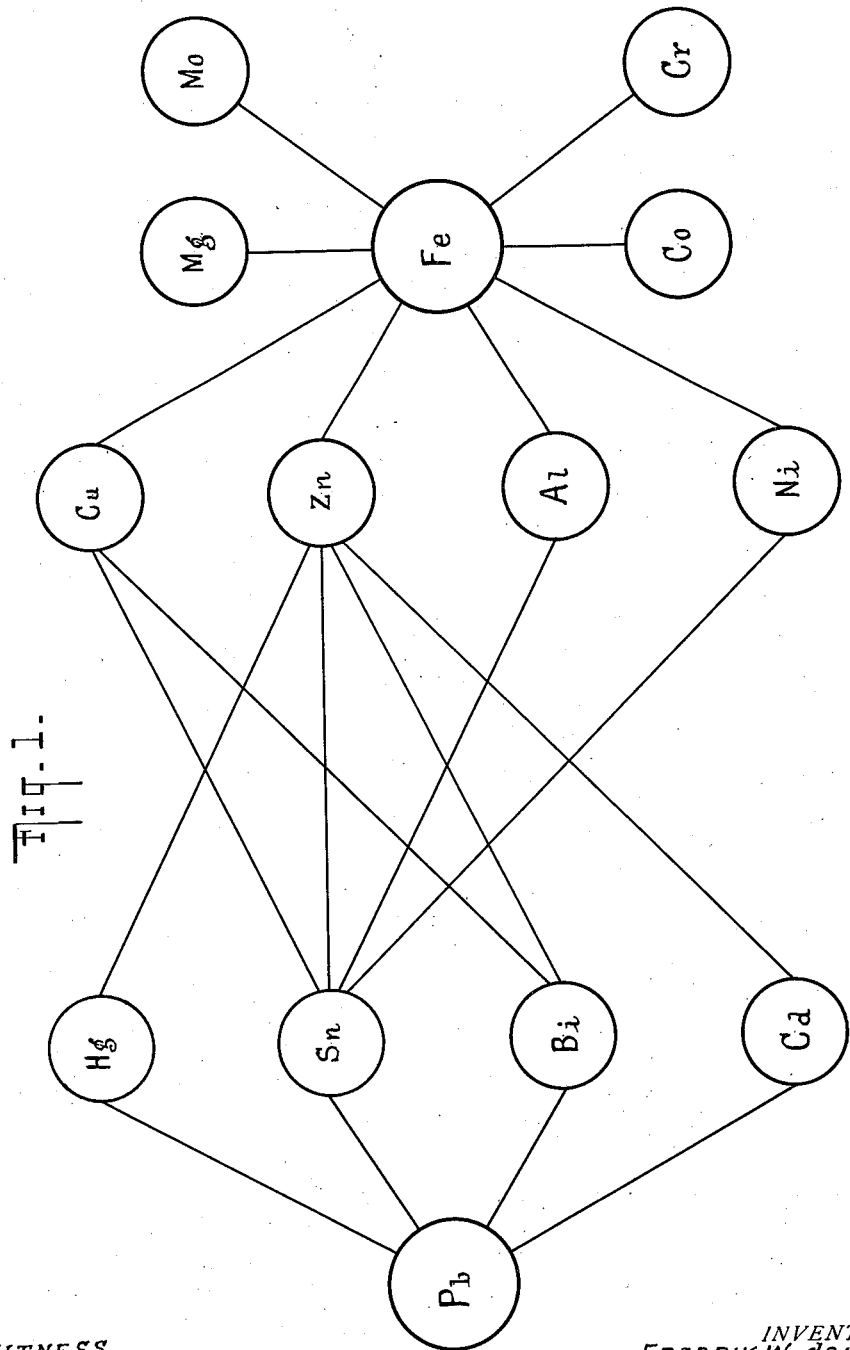

April 22, 1930.  F. W. DE JAHN ET AL  1,755,686
COATED METAL AND PROCESS OF MAKING THE SAME
Filed Oct 10, 1929  3 Sheets-Sheet 1

WITNESS
G. V. Rasmussen

BY

INVENTOR
FREDRIK W. de JAHN
JOSEPH G. DELY
ATTORNEYS

April 22, 1930.  F. W. DE JAHN ET AL  1,755,686
COATED METAL AND PROCESS OF MAKING THE SAME
Filed Oct. 10, 1929  3 Sheets-Sheet 2

WITNESS
G. V. Rasmussen

INVENTOR
FREDRIK W. de JAHN
JOSEPH G. DELY
BY
ATTORNEYS

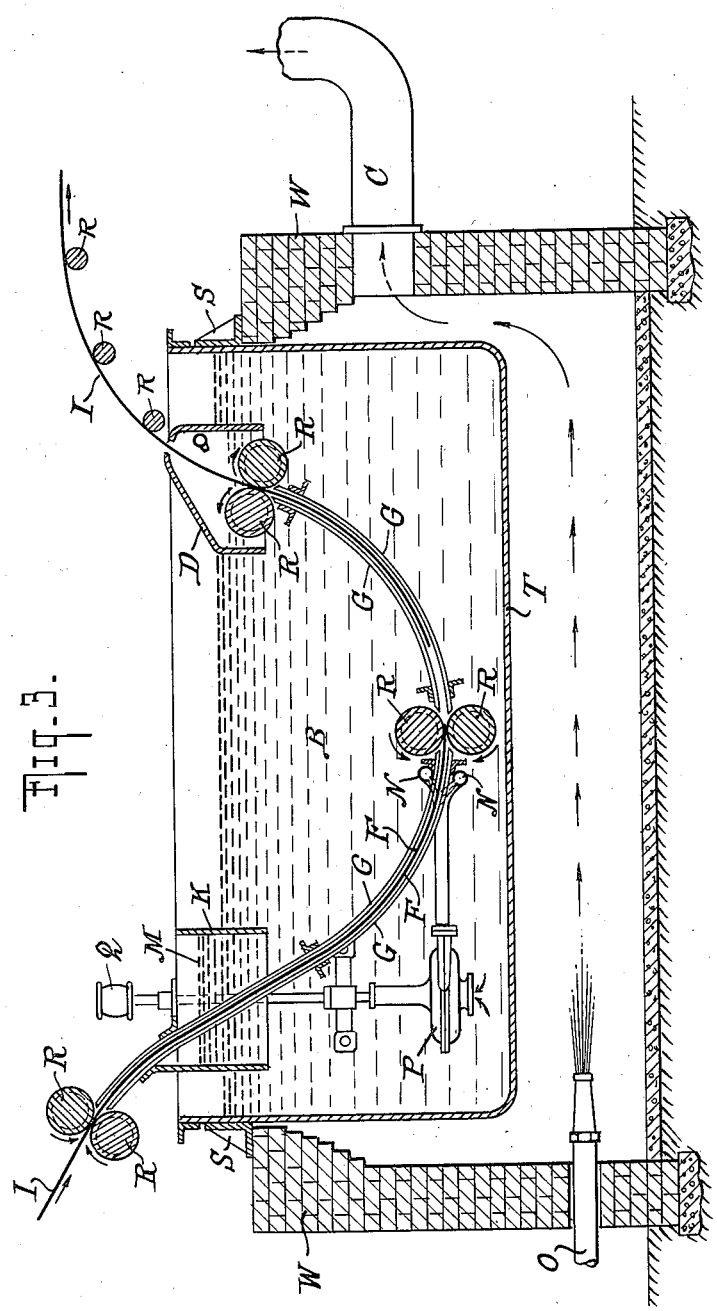

Patented Apr. 22, 1930                                                       1,755,686

UNITED STATES PATENT OFFICE

FREDRIK W. DE JAHN AND JOSEPH G. DELY, OF NEW YORK, N. Y., ASSIGNORS TO CHEMICAL RESEARCH & DESIGNING CORPORATION, OF NEW YORK, N. Y., A CORPORATION OF NEW YORK

COATED METAL AND PROCESS OF MAKING THE SAME

Application filed October 10, 1929. Serial No. 398,734.

The invention relates to the coating of metal surfaces with a relatively incorrodible metallic surface layer for the protection and the preservation of the underlying metal. More particularly the invention is concerned with coating a ferrous material with metal belonging to Group IV in Mendelejeff's Periodic System and having melting points below 400° C. such especially as lead or tin. The invention has for its object the production of a composite article of the type described, in which there will not only be firm and enduring union between the base and the coating material, but in which the coating material shall be continuous, i. e. uninterrupted by punctures or cracks or apertures whereby atmospheric or other outside influences are permitted to come into reactive or corrosive contact with the ferrous foundation material.

In the manufacture of iron or steel products such as plates, tubes, or wires, it has long been a problem to adequately protect the surfaces thereof by an outer layer or coating of a non-corrosive metal such as lead, tin, or zinc. Innumerable attempts have been made to solve the problem, but thus far we are not aware that any thoroughly successful solution has been found. Galvanized iron or steel represents one of the few surviving commercial products of this general type, but galvanized iron has never been sufficiently free from punctures to represent a reliably protected iron or steel foundation. Galvanizing accomplishes only partially and incompletely the real result aimed at. Attempts have been made to coat iron or steel with lead, but lead does not adhere to or bond with the ferrous substances and it has therefore been suggested to interpose a layer of mercury or a copper-mercury layer upon the surface of the iron to serve as a base for the lead coating. Similar suggestions have been made with respect to the application of tin coatings, but there, too, the results did not fulfil the expectations. The prevailing commercial tin plating process is consequently still substantially the same complicated, intricate, and costly procedure which was in use before any such "coating" suggestions were offered. What is needed is a process of extreme simplicity and inexpensiveness which will yield a product in which the ferrous material is reliably coated and protected by a surfacing which is consecutively continuous, i. e., continuously free from punctures or perforations. In addressing ourselves to the problem we proceeded upon the theory that a satisfactory bond between the base metal and the surfacing metal might be established in a manner which would not be detrimental to the continuity of the surface material, provided a relatively small percentage of added metals were present as a blending agent or material and said metals were of a character that they would bind respectively one or more metals with the base and one or more metals with the coating with simultaneous establishment of an inter-bonding relation between the two sets of such metals. Proceeding along these lines and upon investigation of the subject, we found for example that the following metals among others were soluble in iron, to wit, copper, zinc, aluminum, nickel, cobalt, manganese, magnesium. The following metals on the other hand, were found to be soluble in lead: mercury, tin, bismuth, cadmium. Of these two sets of metals, mercury, tin, bismuth and cadmium, all dissolve in zinc, whereas tin and bismuth are also soluble in copper, and tin is again also soluble in aluminum and nickel.

Figure 2:
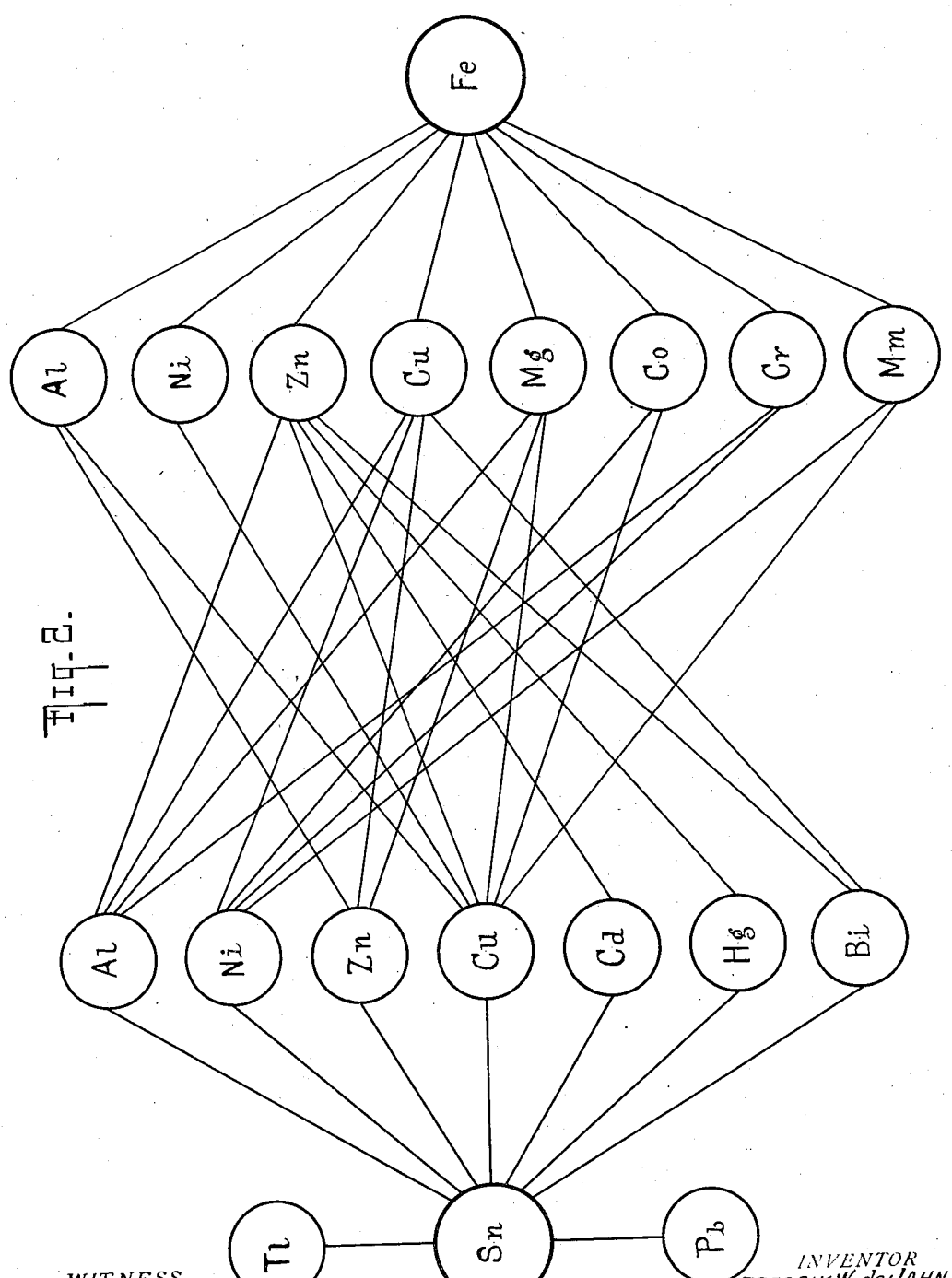

The relation between the respective metals is illustratively shown in the drawings in which Fig. 1 shows the solubility relation of iron and metals soluble in iron as compared with lead and metals soluble in lead, while Fig. 2 is is a similar view in which iron is contrasted with tin. Figure 3 is a longitudinal section of apparatus in connection with which the new process may be carried out.

From Figure 1 of the drawing it would appear that on the iron side of the diagram zinc would be likely to be the most favorable metal to use, but zinc, having a relatively high negative electrolytic potential with respect to hydrogen, would be likely to develop a condition which would render the coating highly and easily corrodible by the formation of electrolytical couples, and for this reason zinc was relegated to an inferior position among the metals from which selection was to be made. Copper was then selected as the metallic element for the iron side of the structure. On the lead side of the structure, tin and bismuth were selected. In order to improve the flowing quality of the mixture, some mercury was used, but the mercury is not employed as the agent to establish the bond between the lead and the iron. The tin and the bismuth, on the other hand, having the property of solubility in lead as well as the property of solubility in copper, participate directly in the establishment and the maintenance of a bond which is effective as between the lead and the iron.

Our experiments demonstrated that our theory was correct. In an illustrative example of the invention the iron or steel is first prepared in the usual way by having its surface thoroughly cleaned, generally by acid pickling with sulfuric acid or hydrochloric acid. It is advisable that the steel or iron material, after the pickling or cleaning operation has been performed, shall be passed through a flux of zinc chloride solution. For making the coating composition for the cleaned ferrous surfaces, a metal bath is prepared, composed of approximately 95 parts of lead and 5 parts of a mixture of copper, tin, bismuth, and mercury. A typical formula would be represented by the following:

| | |
|---|---|
| Lead | 95.8–91.5 parts |
| Copper | .2– .2 part |
| Tin | 3.7– 8 parts |
| Bismuth | .2– .2 part |
| Mercury | .1– .1 part |
| | 100    100 |

The invention may obviously be carried out with other combinations than the particular ones selected for illustrative purposes and the precise proportions of the various ingredients can, of course, be modified within quite a wide range and the foregoing table represents nothing more than specimen baths which in their actual application have given the desired result. After a molten both of these materials has been prepared, the clean surfaced steel or iron is drawn through the bath, preferably in such a way that the flux is restricted to the surface of that part of the bath at which the steel or iron enters, so that the product, upon being withdrawn from the bath, does not again have to pass through a layer of flux at the surface. The flux used for the entrance portion of the surface of the molten bath of metals is generally represented by zinc chloride. The object of using this flux as well as the flux used on the pickled surface of the iron is to bring about a condition in the molten metal bath such that the clean surface of the ferrous material comes into direct contact with the clean metal of the bath. The product produced in this way, when subsequently subjected to the potassium ferric cyanide gelatine test, showed a surface which was free from punctures or perforations. Had there been any such perforations readily visibly, dark blue spots would have at once developed. The union between the coating and the iron base or foundation was as complete and satisfactory as could be desired and can be described as being relatively permanent. It will thus be seen that a satisfactory lead coating of a ferrous base material is brought about as the result of the capacity of copper and/or perhaps its alloys to dissolve in iron on the one hand, and the capacity of tin, bismuth and/or its alloys to dissolve in lead on the other, with an intermediate solution as between the copper on the one hand and the tin and bismuth on the other, all of the metals relied upon to establish the bond being electrolytically relatively inactive in the combination.

In carrying out the process, the preliminary coating of the steel or iron material with a film of flux contributes considerably to the success of the final result since this flux film, being relatively free-flowing and uncontaminated with lead or tin, will, upon contacting with the more viscous flux floating upon the lead bath, be thereby stripped from the iron or steel, so that the iron or steel surfaces come into direct contact with the metallic bath without coming into contact with the floating flux. If the iron or steel plates are not preliminarily coated with the flux and are then dipped into the lead bath upon the surface of which where is a layer of flux, the flux is likely to adhere to the metal surface of the plate and thereby to prevent the metal of the bath from coming into direct contact with the metal of the plate.

The interposition of even small particles of flux between the plates to be coated and the coating material of the molten bath tends to produce punctures, and in order to assure the absence of even small particles of flux on the surface of the metal to be coated during the time that it passes through the bath of molten metal, it has been found advisable to accentuate mechanical agitation, within the metal bath, as between the metal to be coated and the metal of the bath. Such mechanical agitation within the bath of molten metal causes impinging currents in the metal bath to dislodge particles of flux which might otherwise adhere to the surface of the metal to be coated. The establishment of currents within the molten bath may be brought about in various ways, such for example as by agitating the metal to be coated during its passage through the bath, or by operating a stirring device within the bath, or by circulating the metal constituting the metal bath through the pot or otherwise. Preferably, however, a structure such as diagrammatically illustrated in Fig. 3 is employed, wherein a centrifugal circulating device or pump P is driven by pulley Q and functioning directly within the bath B itself and having nozzles N angularly directed against the faces F of the metal to be coated, is used. With such an arrangement the surface of the metal to be coated is exposed, as it were, to jets of molten metal effective on both sides thereof for a width adequate to affect the entire surface of the metal to be coated. The angle at which the currents of the molten metal are directed against the metal to be coated is preferably such as to sweep any material removed from the surface of the metal to be coated toward the upper part of the bath. As shown in Fig. 3, the metal bath is contained in a tank or pot T made of steel plate or the like. This tank may be supported in any suitable manner such as by angle supports S which are mounted upon and secured in brick walls W. These walls constitute a furnace setting which is provided with an oil burner O or the like for heating tank T and with a chimney C for leading off the waste products of combustion produced by the oil burner. The heat generated by the oil burner maintains the bath in a molten state so that the iron or steel plates I, when passed into and through the bath by means of rolls R and guided by bars G, become coated with metal of the bath. The steel plates, as described before, are first passed through a mass of flux M which is shown as being maintained as an elevated column on top of the surface of the lead bath by flux box K. The flux also floats on top of the bath of lead and protects it against oxidation, etc. At that part of the bath where the steel plates come out of the bath a slotted dome or bell D, which is partly submerged in the uppermost layer of the bath, keeps the surface of the metal bath free from flux and protects the coated steel plates from being contaminated with flux or the like, as heretofore explained.

The foregoing operations are particularly advisable in cases where the material to be coated has a course-textured surface, where the tendency to retain particles of flux is accentuated.

Turning next to the coating of iron with tin, the relation between these substances and various other metals is shown in Fig. 2 of the drawing. For the reasons heretofore explained, the selection of metals does not favor zinc and is made, for example, of copper, bismuth, and a small trace of chromium illustratively shown in the following proportions:

| | |
|---|---|
| Tin | 97.64 parts. |
| Bismuth | .39 part. |
| Copper | 1.97 parts. |
| Chromium | Trace. |

In the case of tin and iron it will be observed that there are a great many intermediate metals which are soluble both in zinc and iron. Apparently, however, better results are obtainable by the use of a plurality of bonding or blending agents, one of which at least is soluble only either in iron or in tin, but not soluble in the other. Here again is a fairly wide range of possible combinations and proportions of ingredients, but the procedure which is involved in applying the coating of tin and of the added metals is the same as in the case described with respect to the lead-coated iron. It will be observed that the copper and bismuth used in the process are present in relatively very small proportions, which is a characteristic of the invention. These materials, if a satisfactory result is to be produced, must be kept within a specific range whose lower limit is, of course, above the point where the cohesion-insuring capacity of the said metals begins to function as an effector of cohesion between the metal to be coated and the coating layer and whose upper limit is below the point where precipitation of crystals on the metal to be coated begins. The lower limit is, of course, represented by a fairly constant figure but the upper limit is somewhat variable, dependent upon temperatures employed and the constitution of the molten mass as a whole. Thus, in the formula for the lead coating to be applied to steel, the copper may be present to the extent of .09 parts to 0.2 parts and the bismuth from 0.05 to 0.5 parts, but any substantial excess over said figures will result in a product in which the coating shows a tendency to be defective in spots, apparently, according to our observations, the result of crystalline formation. It is important, therefore, that the percentage of copper and bismuth be limited to the range set forth.

Our success with the foregoing procedure shows that the principles of our invention are also applicable as an improvement upon the existing practice of plating iron with zinc or upon existing galvanizing processes. In that case the addition of small amounts of special bonding agents selected according to the principles of our invention, such as copper, nickel, cobalt, and manganese will greatly increase the bonding strength between the iron and the zinc. The principles of the present invention can also be applied in the case of coated metals other than those which are herein specifically mentioned and such other coated metals, coated in accordance with the present invention, are intended to be included within the scope of the present application.

This application is a continuation in part of an application heretofore filed by the applicants, on April 6, 1927, Serial No. 181,310.

We claim:

1. A method of coating metals with a metal protective layer which consists in preparing a molten mass whose dominant constituent comprises metal belonging to Group IV in Mendelejeff's Periodic System and having a melting point lower than 400° C., said molten mass containing in addition such an amount of bismuth and of copper as is sufficient to cause the protective layer to adhere to the metal to be coated, but insufficient to cause precipitation of crystals on such metal, and then bringing the metal to be coated into contact with the molten mass and forming a layer of the latter upon the former, and causing said layer to congeal.

2. A method of coating metals with a metal protective layer which consists in preparing a molten mass whose dominant constituent comprises lead, but which contains in addition tin, and such an amount of bismuth and of copper as is sufficient to cause the protective layer to adhere to the metal to be coated, but insufficient to cause precipitation of crystals on such metal, and then bringing the metal to be coated into contact with the molten mass and forming a layer of the latter upon the former, and causing said layer to congeal.

3. A method of coating metals with a metal protective layer which consists in preparing a molten mass whose dominant constituent comprises lead, but which contains in addition tin, between .05 and .5 parts of bismuth, and between .05 and .2 parts of copper, bringing the metal to be coated into contact with the molten mass and forming a layer of the latter upon the former, and causing said layer to congeal.

4. A coated metal product, the coating of which is a congealed fusion product in the form of a continuous imperforate layer of lead, and which contains in addition tin, and such an amount of bismuth and of copper as is sufficient to establish a bonding relation between the material of the base and the coating, but insufficient to cause precipitation of crystals on the base.

5. A coated metal product consisting of a base metal and a coating on said base, the dominant constituent of said coating being lead, but the said coating containing in addition tin, between .05 and .5 parts of bismuth, and between .05 and .2 parts of copper.

6. Process such as set forth in claim 1, in which the surfaces of the metal to be coated are subjected during the passage of the metal through the coating bath to physical treatment tending to dislodge adhering particles of foreign matter, said treatment comprising the forcible impingement of jet currents within the bath against the surfaces of the metal to be coated.

FREDRIK W. DE JAHN.
JOSEPH G. DELY.